(12) United States Patent
Shintai

(10) Patent No.: US 7,843,384 B2
(45) Date of Patent: Nov. 30, 2010

(54) VEHICLE COMMUNICATION TERMINAL

(75) Inventor: Tatsuya Shintai, Chita-gun (JP)

(73) Assignee: Denso Corporation, Kariya (JP)

( * ) Notice: Subject to any disclaimer, the term of this patent is extended or adjusted under 35 U.S.C. 154(b) by 184 days.

(21) Appl. No.: 12/217,573

(22) Filed: Jul. 7, 2008

(65) Prior Publication Data
US 2009/0015468 A1   Jan. 15, 2009

(30) Foreign Application Priority Data
Jul. 12, 2007   (JP)   ............... 2007-183208

(51) Int. Cl.
*G01S 19/42* (2010.01)
(52) U.S. Cl. ............... 342/357.25
(58) Field of Classification Search ............ 342/357.06, 342/357.07, 357.08, 357.09; 701/213, 215
See application file for complete search history.

(56) References Cited

U.S. PATENT DOCUMENTS

2004/0201520 A1 * 10/2004 Flick .................. 342/357.07

FOREIGN PATENT DOCUMENTS

| EP | 1 018 457 | 7/2000 |
|----|-----------|--------|
| JP | 11-170981 | 6/1999 |
| JP | 11-313360 | 11/1999 |
| JP | 2003-242578 | 8/2003 |
| JP | 2006-153695 | 6/2006 |
| JP | 2006-155198 | 6/2006 |

OTHER PUBLICATIONS

Office action dated May 22, 2009 in Japanese Application No. 2007-183208.

* cited by examiner

*Primary Examiner*—Dao L Phan
(74) *Attorney, Agent, or Firm*—Harness, Dickey & Pierce, PLC

(57) ABSTRACT

A vehicle communication terminal stops a currently-operating GPS engine when a vehicle is put into a parking condition, memorizes a station number transmitted from a base station that serves as a waiting station, starts the stopped GPS engine when a currently-received station number and plural station numbers memorized after parking do not match, and transmits an emergency report signal including positional information derived from GPS measurement by the GPS engine, pre-registered vehicle information and the like through a communication network to a center terminal or a user terminal for suppressing vehicle battery capacity loss while timely performing an emergency report in case of vehicle theft.

4 Claims, 6 Drawing Sheets

VEHICLE COMMUNICATION TERMINAL

CROSS REFERENCE TO RELATED APPLICATION

The present application is based on and claims the benefit of priority of Japanese Patent Application No. 2007-183208 filed on Jul. 12, 2007, the disclosure of which is incorporated herein by reference.

FIELD OF THE INVENTION

The present disclosure generally relates to a communication terminal for use in a vehicle.

BACKGROUND INFORMATION

Conventionally, an in-vehicle communication terminal carried by a vehicle and configured to determine whether the vehicle is in a stolen condition based on a detection result that indicates that a station number of a base station that is serving as a waiting station has changed after the vehicle is put in a parking condition is available (refer to, for example, Japanese patent document JP-A-H11-170981).

Further, an in-vehicle communication terminal that is configured to send an emergency report by transmitting positional information derived from GPS positioning by an GPS engine to a center terminal or a user terminal after watching a vehicle that is put into a parked condition and determining that the vehicle is in a stolen condition if a travel distance of the parked vehicle reaches a certain value is also available. In this case, if the communication terminal is configured to determine whether the travel distance after parking has reached the certain distance based on the positional information derived from the GPS measurement conducted by the GPS engine, the GPS engine has to be periodically performing the GPS measurement for calculating the travel distance of the vehicle.

However, in the above configuration that periodically performs the GPS measurement by using the GPS engine, the electricity consumption by the GPS engine is not negligible even when the probability of vehicle theft is extremely low or substantially none. As a result, the GPS engine may cause a battery down (i.e., so-called "Dead battery") if the GPS engine is operated only by the vehicle's battery for performing the GPS measurement.

SUMMARY OF THE INVENTION

In view of the above and other problems, the present disclosure provides an in-vehicle communication terminal configured to decrease the battery consumption due to the GPS measurement performed by a GPS positioning unit that is operated by a vehicle battery without compromising a timely transmission of an emergency report in a case that a vehicle is in a stolen condition.

According to one feature of the present invention, an in-vehicle communication terminal includes: a GPS unit capable of determining a position by using a Global Positioning System with a supply of power from a battery in the vehicle; a communication unit capable of communicating wirelessly with a communication network through a station; and a control unit capable of controlling operation of the GPS unit. The communication unit stops, by using the control unit, the operation of the GPS unit that is in operation at a time of parking of the vehicle, and stores a station number received from the station that serves as a waiting station when the vehicle is put in a parking condition, and the communication unit starts, by using the control unit, the operation of the GPS unit that has been stopped when the stored station number at the time of parking and a currently received station number do not match with each other, and sends position information derived from the GPS unit through measurement by the Global Positioning System to the communication network.

In this manner, vehicle's battery consumption is decreased by suppressing the electricity consumption by the GPS unit based on an operation scheme of the GPS unit that stops the GPS unit in a parking condition and delegates the determination of the vehicle travel to the station number of the base station serving as a waiting station instead of the position information derived from the GPS measurement by the GPS unit. Further, when the station number of the base station that serves as the waiting station changes, the GPS unit wakes up for the GPS measurement and the positional information derived from the GPS measurement is transmitted to the network for appropriately providing an emergency report in case of vehicle theft.

BRIEF DESCRIPTION OF THE DRAWINGS

Other objects, features and advantages of the present invention will become more apparent from the following detailed description made with reference to the accompanying drawings, in which.

DETAILED DESCRIPTION

First Embodiment

The first embodiment of the present invention is explained referring to FIG. 1-FIG. 5 as follows. In an in-vehicle communication terminal 1, a radio communication unit 2 (a communication unit, a control unit in the present invention) have a well-known mobile phone function, and receives, as a waiting operation, a station number that is unique to a base station from which the station number has been transmitted. The radio communication unit 2 has a memory memorizing a base station number received from the base station, and plural entries of the respectively different station numbers are storable in the memory.

Figure 1:
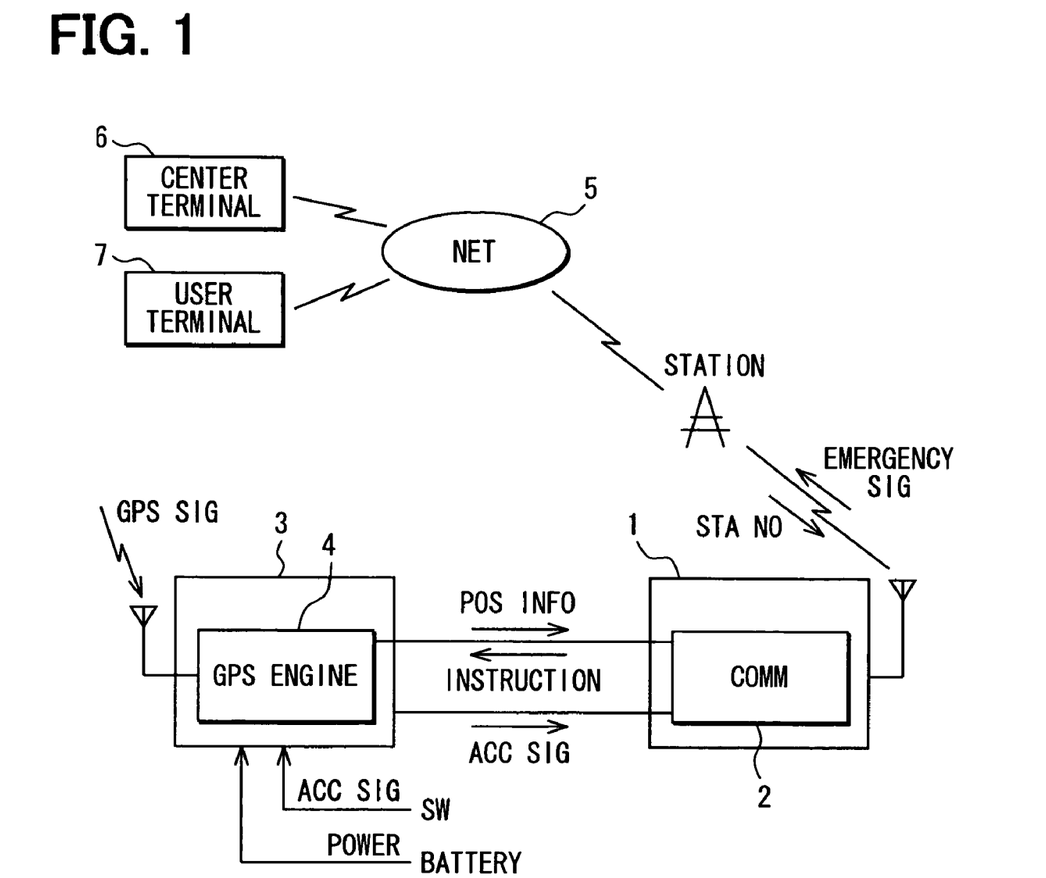
FIG. 1 shows a block diagram of an in-vehicle communication terminal together with a station and terminals in one embodiment of the present invention.

The positioning terminal 3 is turned on and off in connection with an ACC (accessories) signal that turns on and off the terminal 1. A GPS engine 4 (a GPS unit in the present invention) put on the positioning terminal 3 operates on electricity supplied from a vehicle battery, and extracts various parameters from a GPS signal received from GPS satellites during the operation, and determines a current position by calculating the various parameters (i.e., performing GPS positioning), and outputs the current position as positional information to the radio communication unit 2. The GPS engine 4 is always turned on while the positioning terminal 3 is turned on, and is selectively turned on and off when the positioning terminal 3 is turned off.

The communication unit 2 operates on electricity supplied from an internal battery installed on the in-vehicle communication terminal 1, and controls the operation of the GPS engine 4 when the positioning terminal 3 is turned off The communication unit 2 turns off the currently operating GPS engine 4 by outputting a stop instruction, and turns on the currently stopping GPS engine 4 by outputting a start instruction to the GPS engine. That is, in other words, the GPS engine 4 stops at certain timing when the stop instruction from the communication unit 2 is input when the positioning terminal 3 is being turned off, and starts at different timing when the start instruction is input from the communication unit 2. In addition, the radio communication unit 2 inputs an ACC signal through the positioning terminal 3, and watches the turning ON/OFF of the ACC signal. In the configuration mentioned above, the in-vehicle communication terminal 1 may made from a well-known cellular phone, and the positioning terminal 3 may made from a well-known in-vehicle navigation apparatus.

Operation of the above terminal 1 and other components mentioned above is explained referring to FIG. 2-FIG. 5. FIGS. 2 to 5 describe the processing performed by the radio communication unit 2 as the flowcharts. The radio communication unit 2 determines whether an ACC switch is turned off based on the ACC signal input from the positioning terminal 3 (step S1). When the communication unit 2 determines that the ACC switch is turned off (step S1:YES), the radio communication unit 2 outputs a stop instruction to the GPS engine 4, and stops the GPS engine 4 that is operating at the moment of outputting the stop instruction (step S2).

Figure 2:
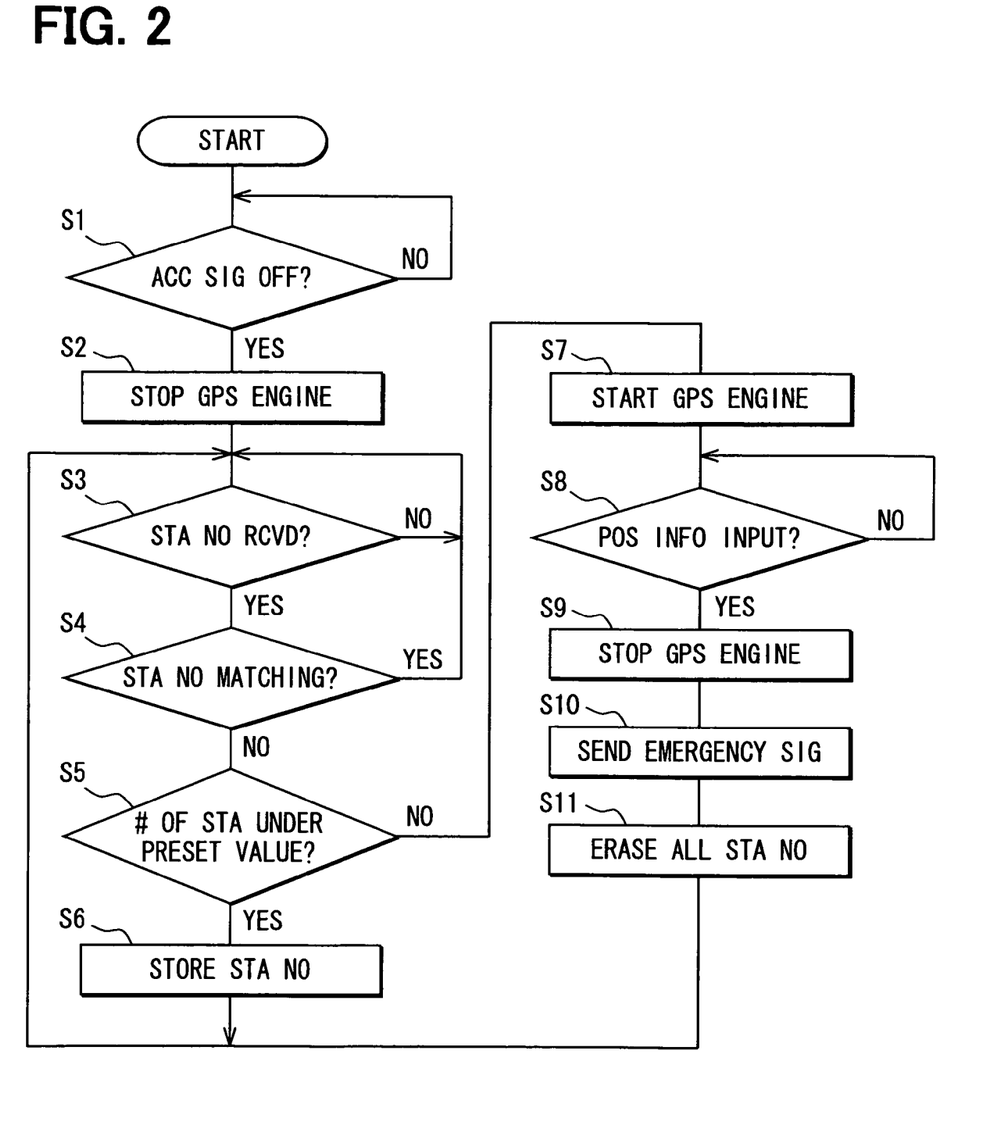
FIG. 2 shows a flowchart of an operation process of the in-vehicle communication terminal in one embodiment of the present invention.

Subsequently, the communication unit 2 determines whether it has received the station number from the base station (step 3), and then determines whether the currently received station number and the station number memorized after the ACC switch is turned off are matching (step S4) when the station number is determined to be received. When both station numbers are matching, that is, when the communication unit 2 determines that the station number has not changed (step S4:YES), the process returns to step S3. On the other hand, when both numbers are not matching, that is, the station number has been changed from the number that is received in the first place (step S4:NO), the communication unit 2 determines whether the number of the station numbers memorized after turning off of the ACC switch is equal to or smaller than a predetermined number (e.g., "3" or the like) (step S5).

When the radio communication unit 2 determines that the number of memorized station numbers after turning off of the ACC switch is equal to or smaller than the predetermined number (step S5: YES), the communication unit 2 stores the currently received station number to a memory area (step S6), and returns to step S3 for subsequently repeating the above processing every time the communication unit 2 receives the station number from the station.

In other words, the radio communication unit 2 repeats processing mentioned above, because the waiting station that serves for the communication unit 2 does not basically change when the vehicle is not moved after being put into the parking condition. In addition, the radio communication unit 2 repeats processing mentioned above, even when the waiting station has been changed, in spite of the absence of the travel of the vehicle from the parked position, due to the change of the radio wave environment if the number of the changed station numbers is within the predetermined number.

The consideration for a case that the vehicle is stolen by, for example, using a truck or the like that carries the vehicle thereon. In this case, the waiting station is changed because of the travel of the vehicle from the parked position. When the communication unit 2 determines that the number of not-changing station numbers being memorized after turning off of the ACC switch is not equal to or smaller than the predetermined number (step S5:NO), he radio communication unit 2 outputs a start instruction to the GPS engine 4, and the GPS engine 4 which has been stopped right after turning off of the ACC switch is started (step S7).

The GPS engine 4 extracts, after being started in the above-described manner, various parameters from a GPS signal received from the GPS satellite, and outputs positional information representing the current position after calculating the extracted parameters for acquiring the current position. The communication unit 2 watches the input of the positional information from the GPS engine 4 (step S8), and stops the currently operating GPS engine 4 by outputting the stop instruction to the GPS engine 4 (step S9) when the input of positional information from the GPS engine 4 is detected (step S8:YES).

Subsequently, the radio communication unit 2 performs an emergency report by transmitting an emergency signal which stores positional information input from the GPS engine 4, vehicle information registered beforehand or the like to a center terminal 6 or a user terminal 7 through the communication network 5 (step S10). Then, the radio communication unit 2 returns to step S3 mentioned above after erasing all of the memorized station number at the moment (step S11) to repeat the above processing.

By the series of processing described above, the radio communication unit 2 stops the GPS engine 4 that is operating after the vehicle is put into the parking condition, starts the operation of the stopped GPS engine 4 when the waiting station changes by the number that is greater than a threshold due to the travel of the vehicle from the parked position, and transmits an emergency signal through the network 5 to the center terminal 6 or the user terminal 7. Then, the radio communication unit 2 stops the started GPS engine 4 again after having performed the emergency report, and starts the operation of the stopped GPS engine 4 to transmit an emergency signal through the network 5 to the center terminal 6 or the user terminal 7 when the waiting station changes by the number that is greater than a threshold due to the travel of the vehicle for repeating the same processing.

Figure 3:
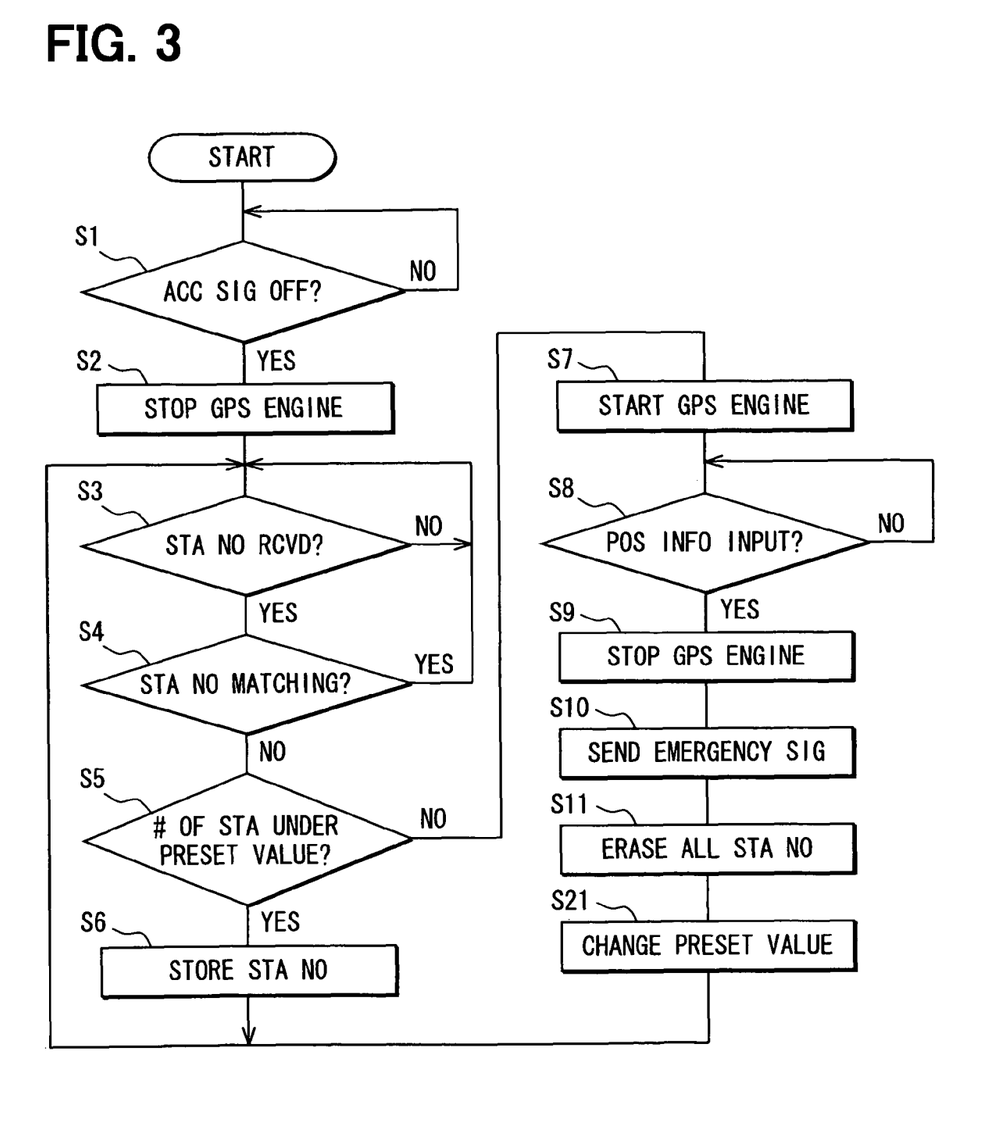
FIG. 3 shows a flowchart of a modified operation process of the in-vehicle communication terminal in one embodiment of the present invention.
Figure 4:
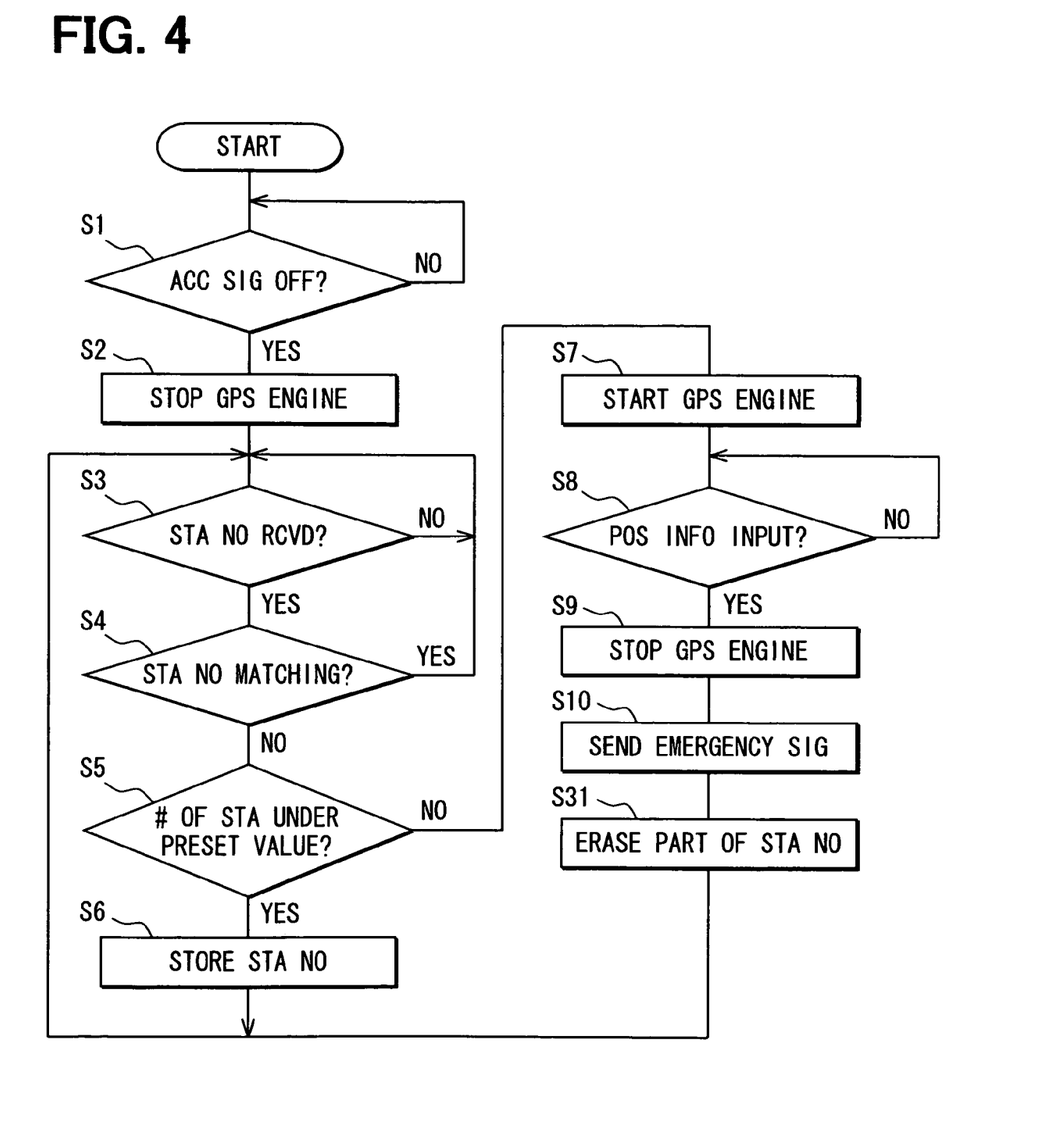
FIG. 4 shows a flowchart of another modified operation process of the in-vehicle communication terminal in one embodiment of the present invention.

The above operation of erasing all of the memorized station numbers and returning to step S3 may be changed to, as shown in FIG. 3, a different operation scheme that the predetermined number of station numbers memorized at the moment is changed after erasing all of the station numbers (step S21) to return to step S3. That is, in other words, the GPS engine 4 can be, for the next time, started based on a condition that is looser than the previous condition for starting if the predetermined number of station numbers is changed to a smaller number (e.g., from "3" to "2", or the GPS engine 4 can be, for the next time, started based on a condition that is stricter than the previous condition for starting if the predetermined number of station numbers is changed to a greater number (e.g., from "3" to "4").

Further, instead of erasing all of the station numbers memorized at the moment, a part of the station numbers among the predetermined number of the station numbers memorized at the moment may be erased (step S31) for returning to step S3 mentioned above as shown in FIG. 4. That is, in other words, by erasing the station numbers with older times of reception operation from the base station and not erasing the station numbers with newer times of reception operation, the stopped GPS engine 4 can be started again on a condition that is looser than the condition for the starting for the first time.

Figure 5:
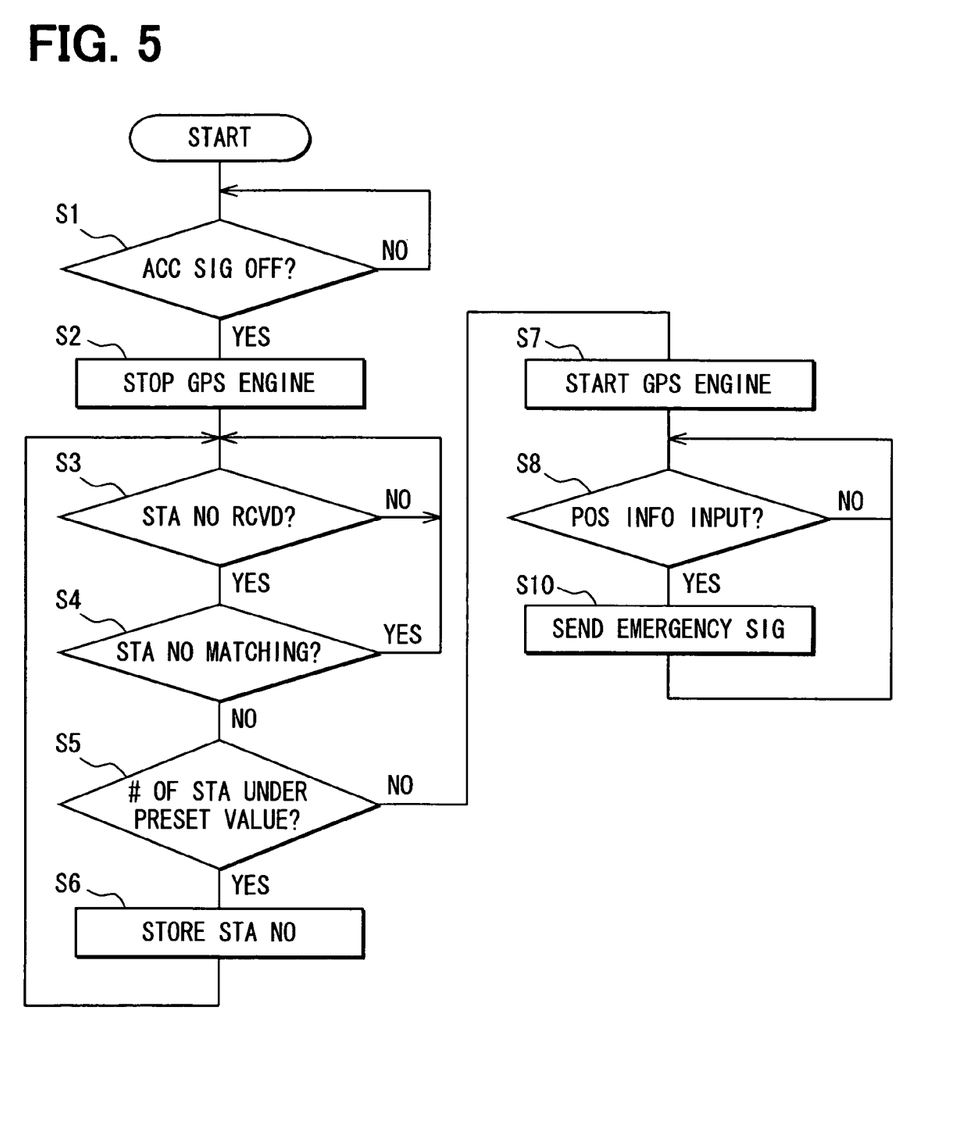
FIG. 5 shows a flowchart of still another modified operation process of the in-vehicle communication terminal in one embodiment of the present invention.

Furthermore, the GPS engine 4 may be kept operating instead of stopping as shown in FIG. 5. Furthermore, the user may determine an operation scheme among the options described above according to a required service level, battery capacity or the like.

According to the configuration of the first embodiment of the in-vehicle communication terminal 1, the operating GPS engine 4 at the moment is stopped and station numbers received from the waiting stations are memorized when the vehicle is put into the parking condition, and, upon detecting the un-matching between the currently received station number and plural station numbers memorized after parking, the stopped GPS engine 4 is started for the GPS measurement and transmission of the emergency signal including the positional information derived from the GPS measurement and the pre-registered vehicle information through the network 5 to the center terminal 6 or to the user terminal 7.

As a result, the electricity consumption by the GPS engine 4 is reduced and the loss of battery capacity is prevented because the travel of the vehicle is detected based on the station number received from the base station. Further, upon detecting the change of the station number of the waiting station received from the base station, the GPS engine 4 is started for the GPS measurement, and the positional information derived from the GPS measurement is transmitted to the center terminal 6 and the user terminal 7 through the network 5 for appropriately performing the emergency reporting in case of vehicle theft.

In addition, due to the operation scheme that the GPS engine 4 is started if the currently received station number does not match any one of the station numbers memorized after parking of the vehicle, the determination accuracy is prevented from deteriorating even when the radio wave environment is changed in spite of the non-travel condition of the vehicle from the parked position, thereby enabling an accurate determination of vehicle theft.

Further, by re-stopping the started GPS engine 4, the electricity consumption by the GPS engine 4 is reduced and loss of vehicle battery capacity is prevented. Furthermore, if the subsequent restarting condition of the GPS engine 4 after re-stopping of the engine 4 is configured to be looser than the first restarting condition, the GPS engine 4 can be more easily started again for performing the GPS measurement and transmitting the positional information to the center terminal 6 or the user terminal 7 through the network 5. Furthermore, the positional information acquired by the GPS engine 4 through the GPS measurement can be transmitted periodically to the center terminal 6 or the user terminal 7 through the network 5 for tracking the travel of the vehicle if the re-started GPS engine 4 is kept operating without re-stopping.

Second Embodiment

Figure 6:
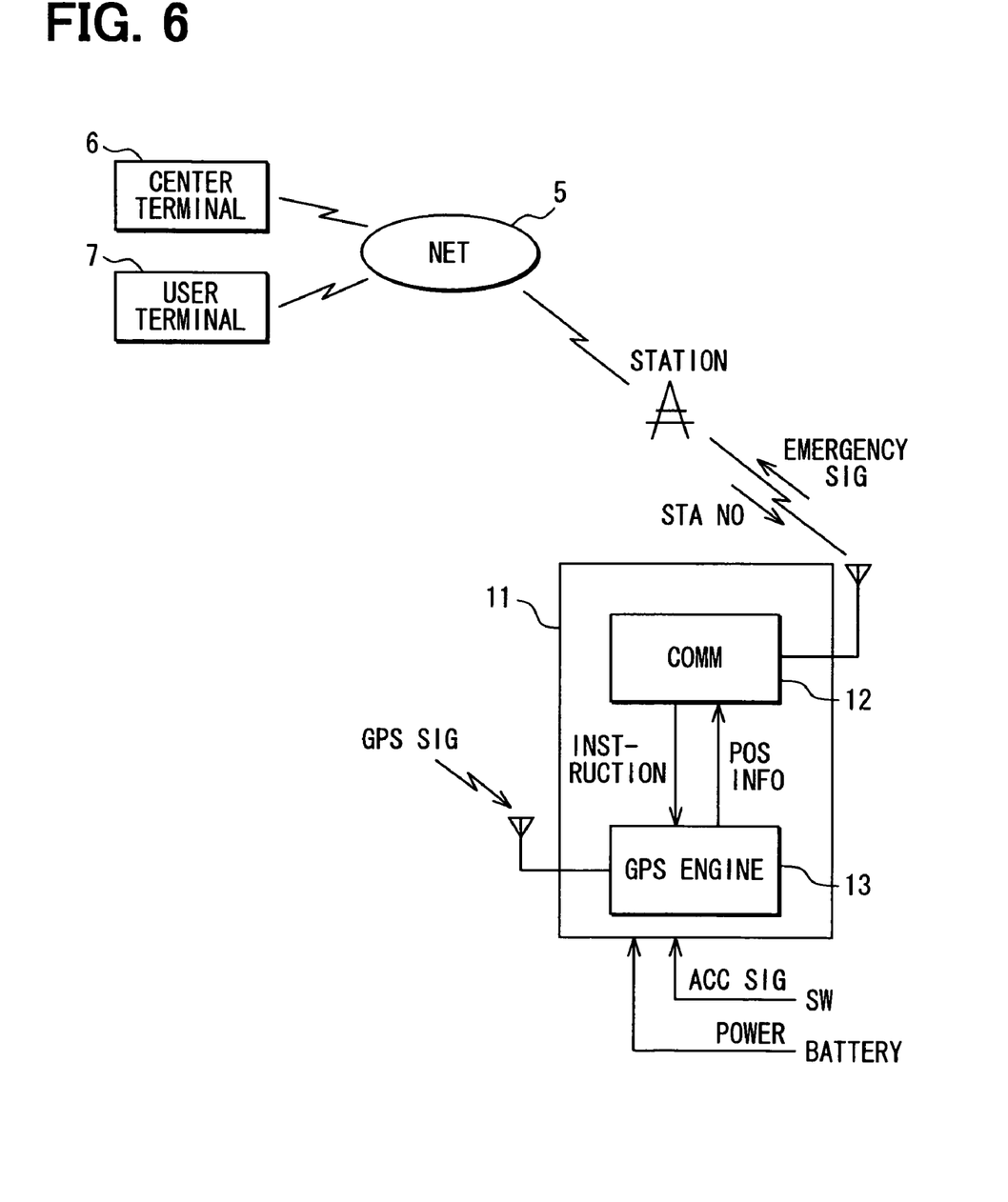
FIG. 6 shows a block diagram of an in-vehicle communication terminal together with a station and terminals in another embodiment of the present invention.

FIG. 6 is referred to for explaining the second embodiment of the present invention. The explanation of the embodiment is omitted for the part that is same as the first embodiment mentioned above, and only a different part is explained. The first embodiment mentioned above describes the configuration that the radio communication unit 2 is installed in the in-vehicle communication terminal 1 and the GPS engine 4 is installed on the positioning terminal 3. In the second embodiment, the radio communication unit and the GPS engine are installed on the in-vehicle communication terminal.

That is, in other words, an in-vehicle communication terminal 11 includes a wireless communication unit 12 that corresponds to the communication unit 2 in the first embodiment (the communication unit and the control unit in the present invention) and a GPS engine 13 that corresponds to the GPS engine 4 in the first embodiment (the GPS unit in the present invention).

The in-vehicle communication terminal 11 is turned on and off in connection with the on and off of the ACC signal. The GPS engine 13 operates on the electricity supplied from the vehicle battery that serves as the operation electricity. The radio communication unit 12 operates, in the same manner as the GPS engine 13, on the electricity supplied from the vehicle battery that servers as the operation electricity, and receives the station number of the waiting station from the base station even when the terminal 11 is turned off. Further, the communication unit 12 is capable of controlling the operation of the GPS engine 13, that is, capable of stopping the operating GPS engine 13 by outputting the stop instruction to the engine 13 and capable of starting the stopped GPS engine 13 by outputting the start instruction to the engine 13. In the configuration mentioned above, the in-vehicle communication terminal 11 may be made from a well-known data communication module. In this case, the radio communication unit 12 performs processing like the radio communication unit 2 which is described in the first embodiment mentioned above.

According to the second embodiment, an effect same as the first embodiment mentioned above is achieved. That is, in other words, the GPS engine 13 is stopped with the determination of the travel of the vehicle relying on the station number received from the waiting station, the electricity consumption by the GPS engine 13 can be reduced, and a capacity fall of the vehicle battery can be prevented. In addition, when the station number received from the base station is changed, the stopped GPS engine 13 is started, and an emergency report can be appropriately performed by transmitting the positional information derived from the GPS measurement to the center terminal 6 or the user terminal 7 through the network 5.

Other Embodiments

Although the present invention has been fully described in connection with the preferred embodiment thereof with reference to the accompanying drawings, it is to be noted that various changes and modifications will become apparent to those skilled in the art.

For example, the in-vehicle communication terminal 1 and the positioning terminal 3 in the first embodiment and the in-vehicle communication terminal 11 in the second embodiment may be made from a dedicated device. In addition, the input of the ACC signal from the communication unit 2 through the positioning terminal 3 may be replaced with a configuration that the ACC signal is directly watched by the direct input of the ACC signal from the communication unit 2. Further, the operation of the communication unit 2 relying on the supply of electricity from the internal battery may be replaced with the operation of the communication unit 2 relying on the supply of electricity from the vehicle battery.

An IG (an ignition) signal may be used in substitution for the ACC signal.

Such changes and modifications are to be understood as being within the scope of the present invention as defined by the appended claims.

What is claimed is:

1. A communication terminal for use in a vehicle comprising:
    a GPS unit capable of determining a position by using a Global Positioning System with a supply of power from a battery in the vehicle;
    a communication unit capable of communicating wirelessly with a communication network through a station; and
    a control unit capable of controlling operation of the GPS unit, wherein
    the communication unit stops the operation of the GPS unit that is in operation at a time of parking of the vehicle for a first time under control of the control unit, and stores a station number received from the station that serves as a waiting station when the vehicle is put in a parking condition,
    the communication unit starts, as a first wake-up of the GPS unit, by using the control unit, the operation of the GPS unit that has been stopped when the stored station number at the time of parking and a currently received station number do not match with each other, and sends position information derived from the GPS unit through measurement by the Global Positioning System to the communication network,
    the communication unit stops the operation of the GPS unit for a second time under control of the control unit after sending, to the communication network, the position information in the first wake up of the GPS unit,
    the communication unit changes a wake-up condition of the GPS unit for a second wake-up in comparison to the wake-up condition for the first wake-up after stopping of the operation of the GPS unit for the second time, the wake-up condition of the GPS unit being changed by erasing the station numbers with older times of reception operation from the base station and not erasing the station numbers with newer times of reception operation, and
    the communication unit starts, as the second wake-up, the GPS unit based on the wake-up condition for the second wake-up when the changed wake-up condition for the second wake-up is fulfilled.

2. The communication terminal of claim 1, wherein
    the communication unit stores plural number of respectively different station numbers, and
    the communication unit sends, to the communication network, the position information derived from the GPS unit by starting the operation of the GPS unit under control of the control unit when the currently received station number does not match any one of the plural number of respectively different station numbers that are stored at the time of parking of the vehicle.

3. The communication terminal of claim 1, wherein
    the communication unit continues the operation of the GPS unit without stopping under control of the control unit to send at regular intervals, to the communication network, the position information derived from the GPS unit, when the GPS unit sends the position information to the communication network after being started by the control unit due to a determination that a currently received station number does not match the station number stored at the time of parking of the vehicle.

4. The communication terminal of claim 1, wherein the changing of the wake-up condition of the GPS unit is a loosening of the wake-up condition.

\* \* \* \* \*